(No Model.) 2 Sheets—Sheet 1.

F. M. WELSHIMER.
SHEEP DIPPING DEVICE.

No. 533,151. Patented Jan. 29, 1895.

Witnesses:
L. C. Hills.
Helena Bauer

Inventor:
Fillmore M. Welshimer,
by Collamer & Co.,
Attorneys (No Model.) 2 Sheets—Sheet 2.
F. M. WELSHIMER.
SHEEP DIPPING DEVICE.
No. 533,151. Patented Jan. 29, 1895.
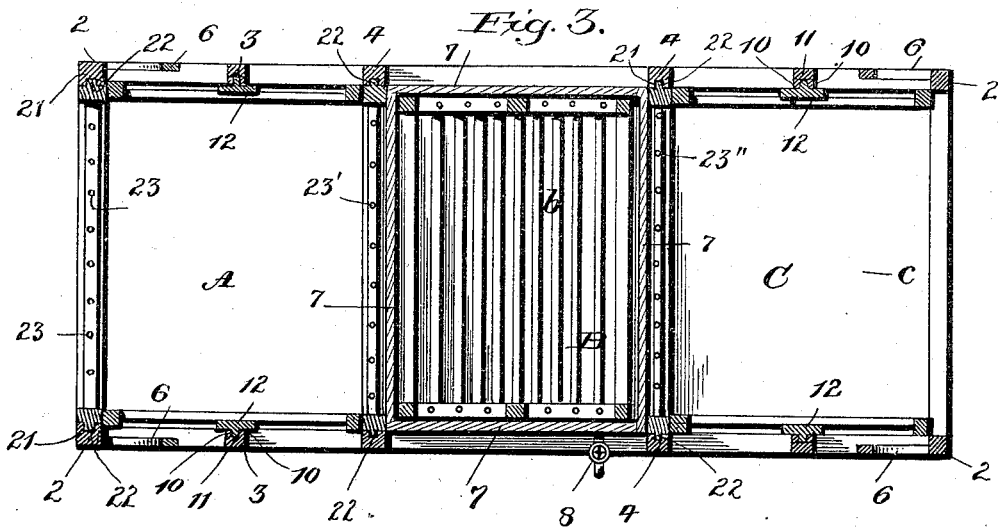
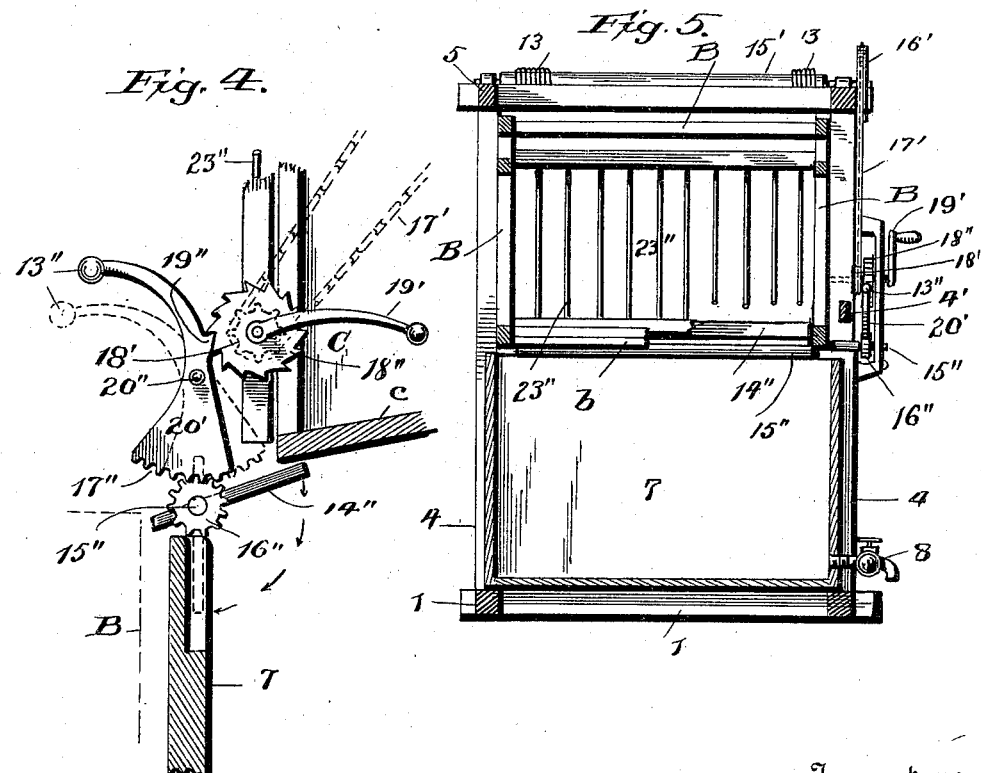
Witnesses:
L. C. Hills.
Helena Bauer
Inventor:
Fillmore M. Welshimer,
by Collamer & Co.
Attorneys.
THE NORRIS PETERS CO., PHOTO-LITHO., WASHINGTON, D. C.

UNITED STATES PATENT OFFICE.

FILLMORE M. WELSHIMER, OF COLUMBIA CITY, INDIANA.

SHEEP-DIPPING DEVICE.

SPECIFICATION forming part of Letters Patent No. 533,151, dated January 29, 1895.

Application filed April 18, 1894. Serial No. 508,031. (No model.)

*To all whom it may concern:*

Be it known that I, FILLMORE M. WELSHIMER, a citizen of the United States, and a resident of Columbia City, Whitley county, State of Indiana, have invented certain new and useful Improvements in Sheep-Dipping Devices, and my preferred manner of carrying out the invention is set forth in the following full, clear, and exact description, terminating with claims particularly specifying the novelty.

This invention relates to animal stocks, and more especially to that class thereof adapted for sheep; and the object of the same is to produce an improved device for dipping sheep in suitable liquid for the purpose of killing ticks and lice and curing scab.

To this end the invention consists in the specific construction of parts as hereinafter more fully described, and as shown on the two sheets of drawings accompanying, wherein—

Figure 1:
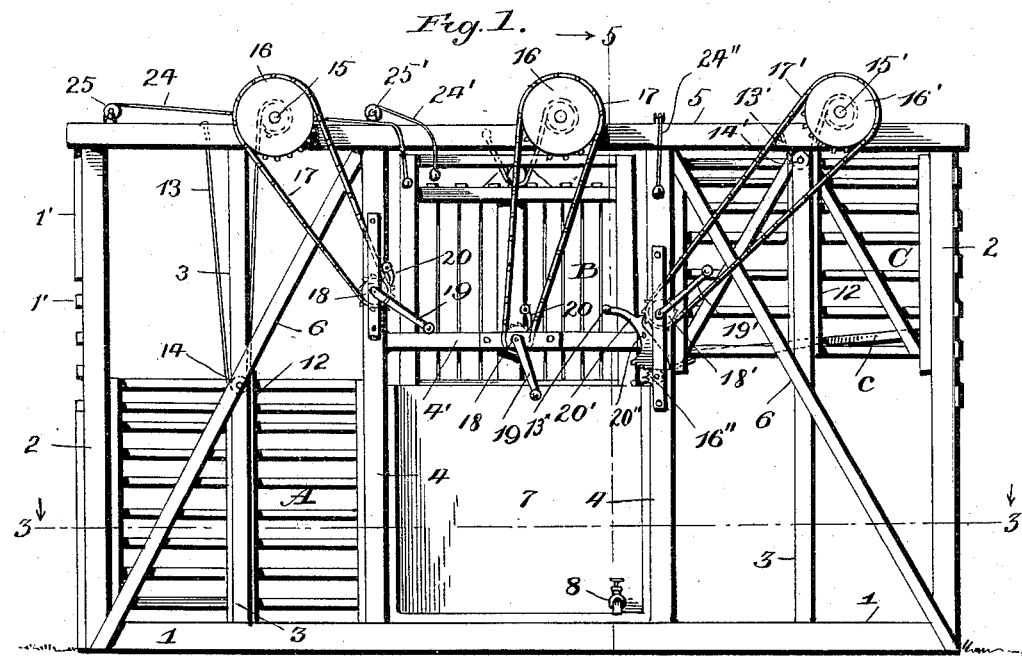
Figure 2:
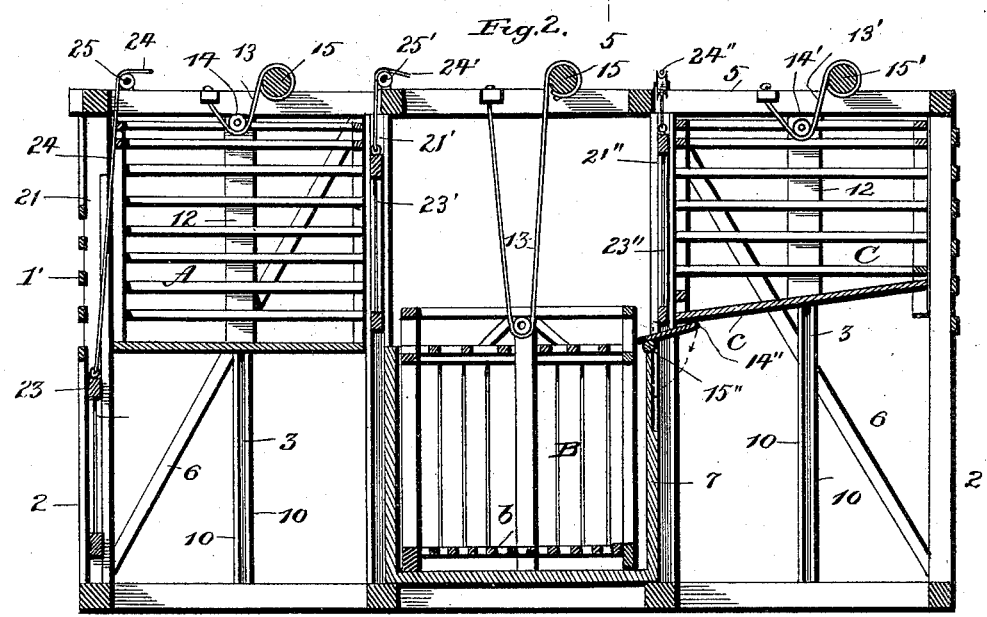

Figure 1 is a side elevation of this machine complete showing the first cage as lowered and the second and third cages as raised. Fig. 2 is a central longitudinal section showing the first and third cages as raised and the second cage as lowered. Fig. 3 is a horizontal section on the line 3—3 of Fig. 1 showing all the cages as lowered. Fig. 4 is an enlarged detail in end elevation, showing the mechanism for supporting the third cage as locked in full lines and as unlocked in dotted lines whereby the dripping board is turned to the position seen in dotted lines in Fig. 2. Fig. 5 is a cross section on the line 5—5 of Fig. 1.

Referring to the said drawings, the numeral 1 designates a sill from which rise suitable corner posts 2 and intermediate uprights 3 and 4, all supporting a top framework 5 preferably braced as at 6 and whereof the construction and materials of parts are matters of no moment. Between the innermost uprights 4 is a closed tank 7 adapted to contain water or other suitable liquid for killing ticks and lice, and for curing scab; and this tank may be filled in any manner and emptied when desired through a faucet 8.

Within the outermost uprights 3 are vertical ribs 10 in which slide tongues 11 on the outer faces of side pieces 12 which form parts of the framework of cages A and C. The latter may be of any suitable construction, but are preferably of light wood with slatted sides and top, open ends, and closed flooring as seen. A pair of ropes 13 is secured to the top framework 5, passes under pulleys 14 at the top of the cage A, and is then led upward and wound over a shaft 15 journaled in bearings on the top framework 5 and having a sprocket wheel 16 on one extremity. A sprocket chain 17 leads from this wheel to a small sprocket wheel 18 journaled on one of the intermediate uprights and having a crank-handle 19 whereby it can be rotated; and 20 is a suitable latch engaging this sprocket wheel or a ratchet wheel on its hub as indicated in dotted lines in Fig. 1. By this construction the turning of the crank-handle 19 turns the shaft 15 with less speed but greater power, and the ropes 13 cause the cage A to rise; after which it may be held suspended by engaging the latch 20 with the small sprocket wheel 18 on its ratchet hub.

The cage C is constructed in a similar manner except that its flooring c is inclined toward the center of the device; and the raising and supporting mechanism of this cage is the same with the exceptions intimated below, and is designated by the same reference numerals primed. Referring now to Figs. 4 and 5, it will be seen that the latch 20' for the ratchet hub 18'' of the small sprocket 18' is centrally pivoted as at 20'' and has a dog 19'' above its pivot adapted to engage the teeth of the ratchet. At its lower end this cage has a toothed segment 17'' meshing with a gear 16'' secured to the end of a shaft 15'' which extends across the machine just above the rear edge of the tank 7. To the upper side of this shaft is secured a dripping board 14'' whose inner edge projects slightly over the tank and whose outer edge is sufficiently thick to extend under the flooring c of the cage C. When the handle 13'' of the latch 20' is moved so as to disengage the dog 19'' from the ratchet 18'', the toothed segment 17'' causes the gear 16'' to turn the shaft 15'', and the dripping board 14'' is dropped alongside the rear wall of the tank 7 as will be clear. This movement of the latch disengages the ratchet 18'' and permits the cage C to descend by its weight. To raise the cage, the crank 19' is turned the same as the turning of the crank 19 raises cage A, and when cage C is rising to a proper point, the latch 20' is moved to engage its dog with the ratchet, which movement turns the dripping board so as to direct the drippings from the inclined bottom c into the tank 7.

The intermediate cage B is preferably constructed of metal with a slatted flooring b and with closed top and open ends. The mechanism for raising and supporting this cage is practically the same as that for cage A and is not further described. The drawings show a transverse bar 4' connecting the innermost uprights and supporting the shaft of the crank-handle, small gear, ratchet, and the pawl for holding the ratchet; although the precise location of these parts is immaterial.

The front corner posts 2 are provided with interior grooves 21 engaged by ribs 22 on the edges of a front gate 23; and 24 is a string or cord leading upward from this gate, over suitable pulleys 25 in the top framework 5, and to a point within reach of the operator. The front innermost uprights 4 are provided with similar grooves 21' in which moves a gate 23' controlled by a cord 24' in the same manner. The rear innermost uprights 4 also contain similar grooves 21" in which moves a gate 23" controlled by a cord 24". There is no gate at the outlet end of the machine. It will be obvious that a great many changes in the specific details of construction may be made without departing from the principle of my invention; also that the exact sizes, shapes, materials and proportions of parts are not essential to the successful operation of the whole.

In use, cage A is lowered and gate 23 raised, and two or three sheep driven into this cage according to its capacity. Crank 19 is then turned to raise cage A whereby its open front end will be closed by the slatting 1' across the front end of the frame. Gate 23' is then lowered opposite the front end of the tank, which opens the rear end of cage A, and the sheep are driven into cage B. Gates 23' and 23" being then raised, both ends of the intermediate cage C are closed so that the sheep are hemmed in without a chance to escape. This cage B is then lowered into the tank to dip the sheep in the water therein, and immediately raised out of the tank before harm has come to the sheep. Meanwhile a first operator may have again lowered cage A and driven a second lot of sheep therein. Cage C is then raised and the latch 20' turned to hold it elevated, which movement of the latch turns the dripping board under the lower edge of the inclined flooring c. Gate 23" is then dropped just in rear of the tank, and the wet sheep driven into cage C where they stand on the inclined flooring and the drippings run over the dripping board 14" back into the tank. Gate 23" is then raised to separate cages B and C, and the second lot of sheep can be driven into the intermediate cage and dipped in a similar manner.

By the time this has been accomplished, the first lot of sheep have been drained of their drippings, and cage C is lowered to or nearly to a level with the ground so that this lot of sheep can run out. Cage C is then raised and the second lot of sheep treated in the same manner. By this construction and arrangement of parts it will be seen that the drippings are retained as far as possible and caused to run back into the tank 7. I need not specify the medicaments which I mix with the water in the tank for the purpose of killing ticks and lice, and also for curing scab and other diseases and ailments which may affect the sheep; but it will be obvious that the tank once filled will serve for a long time, because so much of water held by the thick wool of the sheep is permitted to drip onto the inclined flooring and run back into the tank—rather than being carried away by the wet sheep and shaken off or be allowed to drip onto the ground and be wasted.

What is claimed as new is—

1. In a sheep dipping device, the combination with a tank, a vertically movable cage, and mechanism for dropping it into and raising it out of the tank; of an outlet cage movable vertically in guides at the rear end of the tank and having a flooring inclining toward the tank, and a dripping board adapted to be moved so that one edge shall stand under the inclined flooring and the other edge deliver the drippings into the tank, as and for the purpose set forth.

2. In a sheep dipping device, the combination with a tank, a vertically movable cage, and mechanism for dropping it into and raising it out of the tank; of an outlet cage movable vertically at the rear end of the tank and having a flooring inclining toward the tank, a shaft journaled across the device near the rear edge of the tank, and a dripping board carried by said shaft and adapted to be turned so that one edge shall stand under the inclined flooring and the other edge deliver the drippings into the tank, substantially as described.

3. In a sheep dipping device, the combination with a tank, a vertically movable cage, and mechanism for dropping it into and raising it out of the tank; of an outlet cage movable vertically at the rear end of the tank and having a flooring inclining toward the tank, a shaft journaled across the device near the rear edge of the tank, a dripping board carried by said shaft and adapted when raised to deliver the drippings from the flooring into the tank, a lever for turning this shaft, a dog on the lever, a windlass for raising the outlet cage, and a ratchet on the windlass with which said dog engages when the dripping board is in operative position, substantially as described.

4. In a sheep dipping device, the combination with a tank, a dripping cage in rear of the tank having its flooring inclined toward the tank, and an inlet door for said cage; of a windlass for raising the cage, a ratchet connected with the windlass, a shaft journaled across the device and having a gear on one end, a dripping board carried by the shaft and adapted to be turned so as to deliver the drippings from said flooring into the tank, and a centrally pivoted latch having a toothed segment at one end meshing with said gear and a dog at the other end engaging the teeth of said ratchet when the dripping board is raised, as and for the purpose set forth.

5. In a sheep dipping device, the combination with a tank, a vertically movable dipping cage, an inlet door at the front end of said cage, an approach to said door, a dripping cage in rear of the tank, and an inlet door for said cage; of a windlass for raising the latter cage, a ratchet connected with the windlass, a shaft journaled across the device and having a gear on one end, a dripping board carried by the shaft and adapted to be turned so as to deliver the drippings from said flooring into the tank, and a centrally pivoted latch having a toothed segment at one end meshing with said gear and a dog at the other end engaging the teeth of said ratchet when the dripping board is raised, as and for the purpose set forth.

6. A sheep dipping device consisting of a framework having grooved corner posts, uprights next inside said posts and provided with ribs, and uprights near the center of the framework provided with grooves, a tank between the bottom of the innermost uprights, a dipping cage between these uprights, an inlet cage in front of the tank, and an outlet cage in rear thereof, grooved side pieces on said inlet and outlet cages sliding on the ribs of the outermost uprights, a door at the front end of each cage sliding in grooves in the corner posts and in the innermost uprights, a shaft supported by the innermost uprights at the rear of the tank, a dripping board secured to said shaft, and mechanism substantially as described for raising and lowering each door and each cage at will, as and for the purpose set forth.

7. In a sheep dipping device, the combination with a framework having a tank at its center, a vertically movable dipping cage working into and out of said tank, a vertically movable inlet cage working forward of the tank, a vertically movable outlet cage working in rear of the tank and having a flooring inclining toward the same, vertically movable gates sliding in guides just in front and rear of the tank, a vertically movable gate sliding in guides at the front end of the inlet cage, and stationary slatting carried by the framework opposite the front end of this cage when in raised position, as and for the purpose set forth.

In testimony whereof I have hereunto subscribed my signature on this the 11th day of April, A. D. 1894.

FILLMORE M. WELSHIMER.

Witnesses:
DANIEL HALDEMAN,
EDWARD BRIGGS.